(12) United States Patent
Kim

(10) Patent No.: US 7,295,370 B2
(45) Date of Patent: Nov. 13, 2007

(54) PROJECTION TELEVISION AND MANUFACTURING METHOD THEREOF

(75) Inventor: Sang-hak Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 263 days.

(21) Appl. No.: 10/960,014

(22) Filed: Oct. 8, 2004

(65) Prior Publication Data

US 2005/0105178 A1    May 19, 2005

(30) Foreign Application Priority Data

Nov. 13, 2003   (KR) .................. 10-2003-0080148

(51) Int. Cl.
*G03B 21/56* (2006.01)
*G03B 21/60* (2006.01)
*B61D 27/00* (2006.01)
*H04N 5/64* (2006.01)
*H04N 3/14* (2006.01)

(52) U.S. Cl. .............. 359/457; 359/460; 359/449; 454/86; 454/96; 348/787; 348/789; 348/794; 348/836

(58) Field of Classification Search .......... 359/460, 359/443, 449, 457, 896, 900; 454/86, 96; 348/739, 748, 776, 787, 789, 794, 805, 836
See application file for complete search history.

(56) References Cited

U.S. PATENT DOCUMENTS

| | | | | |
|---|---|---|---|---|
| 4,921,330 A | * | 5/1990 | Takahashi et al. .......... | 359/457 |
| 5,013,132 A | * | 5/1991 | Yokoo et al. .............. | 359/457 |
| 5,074,644 A | * | 12/1991 | Hirai et al. .............. | 359/455 |
| 5,184,224 A | | 2/1993 | Mitani et al. ............ | 358/231 |
| 5,513,036 A | | 4/1996 | Watanabe ................ | 359/457 |
| 5,697,687 A | * | 12/1997 | Coleman et al. .......... | 353/122 |
| 5,831,585 A | * | 11/1998 | Aoki et al. .............. | 345/32 |
| 5,844,715 A | | 12/1998 | Park .................... | 389/457 |
| 5,887,959 A | * | 3/1999 | Yuri .................... | 312/7.2 |
| 6,137,548 A | * | 10/2000 | Uchida et al. ........... | 348/818 |
| 6,185,038 B1 | | 2/2001 | Yamaguchi et al. ....... | 359/457 |
| 6,614,594 B2 | * | 9/2003 | Murasugi et al. ......... | 359/450 |

FOREIGN PATENT DOCUMENTS

| | | |
|---|---|---|
| JP | 7-114101 | 5/1995 |
| JP | 9-197557 | 7/1997 |
| KR | 20-141981 | 1/1999 |
| KR | 1999-3405 | 1/1999 |
| KR | 20-156675 | 6/1999 |
| KR | 1999-85647 | 12/1999 |
| KR | 2000-8688 | 2/2000 |
| KR | 2000-44836 | 7/2000 |
| KR | 20-231662 | 5/2001 |

\* cited by examiner

*Primary Examiner*—Diane Lee
*Assistant Examiner*—Magda Cruz
(74) *Attorney, Agent, or Firm*—Staas & Halsey LLP

(57) ABSTRACT

A projection television including: a screen having a plurality of image-forming sheets and an anti-dust film having a first side disposed between the image-forming sheets and a second side disposed at a front of the screen, and being detachable from the screen.

23 Claims, 5 Drawing Sheets

PROJECTION TELEVISION AND MANUFACTURING METHOD THEREOF

CROSS-REFERENCE TO RELATED APPLICATION

This application claims the benefit of Korean Patent Application No. 2003-80148, filed Nov. 13, 2003, in the Korean Intellectual Property Office, the disclosure of which is incorporated herein by reference.

BACKGROUND OF THE INVENTION

1. Field of the Invention

The present invention relates to a projection television, and more particularly, to a projection television improved to prevent dust generated inside a screen.

2. Description of the Related Art

Conventionally, a projection television comprises an optical engine to project an image beam, a reflecting mirror to reflect the projected beam and a screen to form an image with the reflected beam. The projection television further comprises a front casing provided in front of the screen to form a front external appearance and having an opening to expose the image of the screen, a rear casing provided at a rear of the screen to form a rear external appearance and to support the reflecting mirror and the optical engine and a screen bracket provided at a rear edge of the screen to support the screen.

An optical engine can be classified by the method used. Such methods include a CRT (Cathode-Ray Tube) method, an LCD (Liquid Crystal Display) method, and a DLP (Digital Light Processing) method, but are not necessarily limited thereto.

The screen comprises a Lenticular lens and a Fresnel lens to form an image with the reflected beam from the reflecting mirror and a sunscreen provided in the front of the Lenticular lens and the Fresnel lens to protect the Lenticular lens and the Fresnel lens. The sunscreen is connected to the front casing by the screen bracket.

However, in the conventional projection television, a friction may be caused between the Lenticular lens and the Fresnel lens by being shaken or by an external force while in motion, which may generate dust between the image-forming lenses. Thus, in the conventional projection television, when the television should be transported for a long time, the television has been transported with the screen detached and the screen has not been assembled until the television has arrived at a destination, which causes an inconvenience to separately transport the screen and assemble the screen at the destination and increases the cost for separately transporting and assembling the screen.

BRIEF SUMMARY

Accordingly, it is an aspect of the present invention to provide a projection television to prevent dust inside a screen and a manufacturing method thereof.

The foregoing and/or other aspects of the present invention are achieved by providing a projection television comprising: a screen having a plurality of image-forming sheets; and at least one anti-dust film having a first side provided between the image-forming sheets and a second side exposed to a front of the screen and detachable from the screen.

The image-forming sheets may include a Fresnel lens and a Lenticular lens disposed in the front of the Fresnel lens, and the first side of the anti-dust film may be disposed between the Fresnel lens and the Lenticular lens.

The first side of the anti-dust film may be disposed at an upper part between the Fresnel lens and the Lenticular lens.

The projection television may further comprise a casing having a mask provided on a front edge of the screen; and a screen supporter to support the screen. The second side of the anti-dust film may be disposed between the mask and the screen.

The screen supporter may include a screen holder to accommodate the edge of the screen, and a part of the anti-dust film may be accommodated in the screen holder together with the screen.

The anti-dust film may be vinyl.

According to another aspect of the present invention, there is provided a manufacturing method of a projection television including a screen having a plurality of image-forming sheets to form an image and a casing to support the screen, including: detachably inserting an anti-dust film between the image-forming sheets, with a part of the anti-dust film being exposed between the image-forming sheets; and connecting the screen having the anti-dust film detachably inserted between the image-forming sheets to the casing.

According to yet another aspect of the present invention, there is provided a method of preventing dust generation between image forming sheets of a projection television including a screen having a plurality of image-forming sheets and a casing to support the screen. The method includes: detachably positioning at least a portion of an anti-dust film between the image forming sheets; and connecting the screen to casing.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
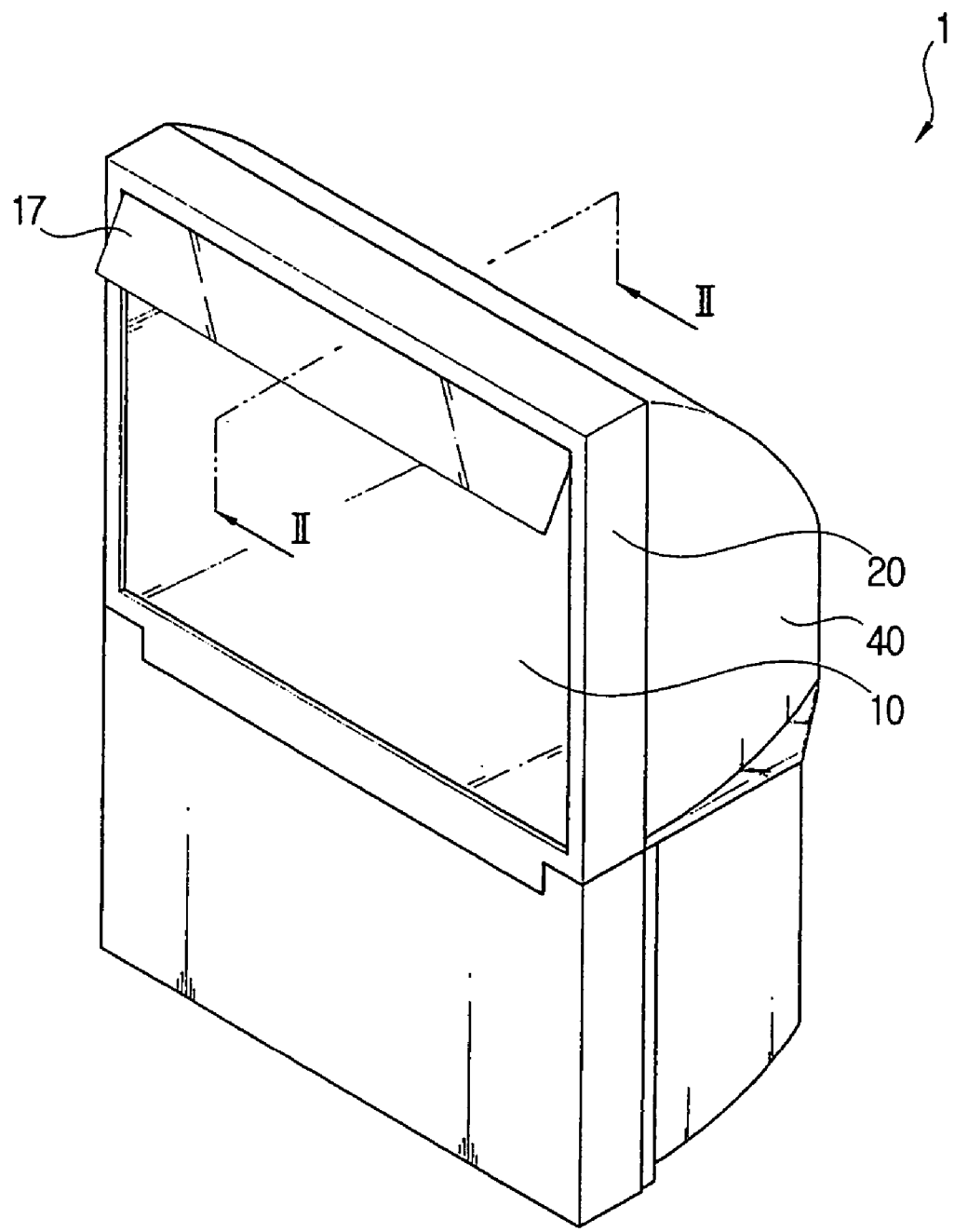
FIG. 1 is a perspective view of a projection television according to an embodiment of the present invention.
Figure 2:
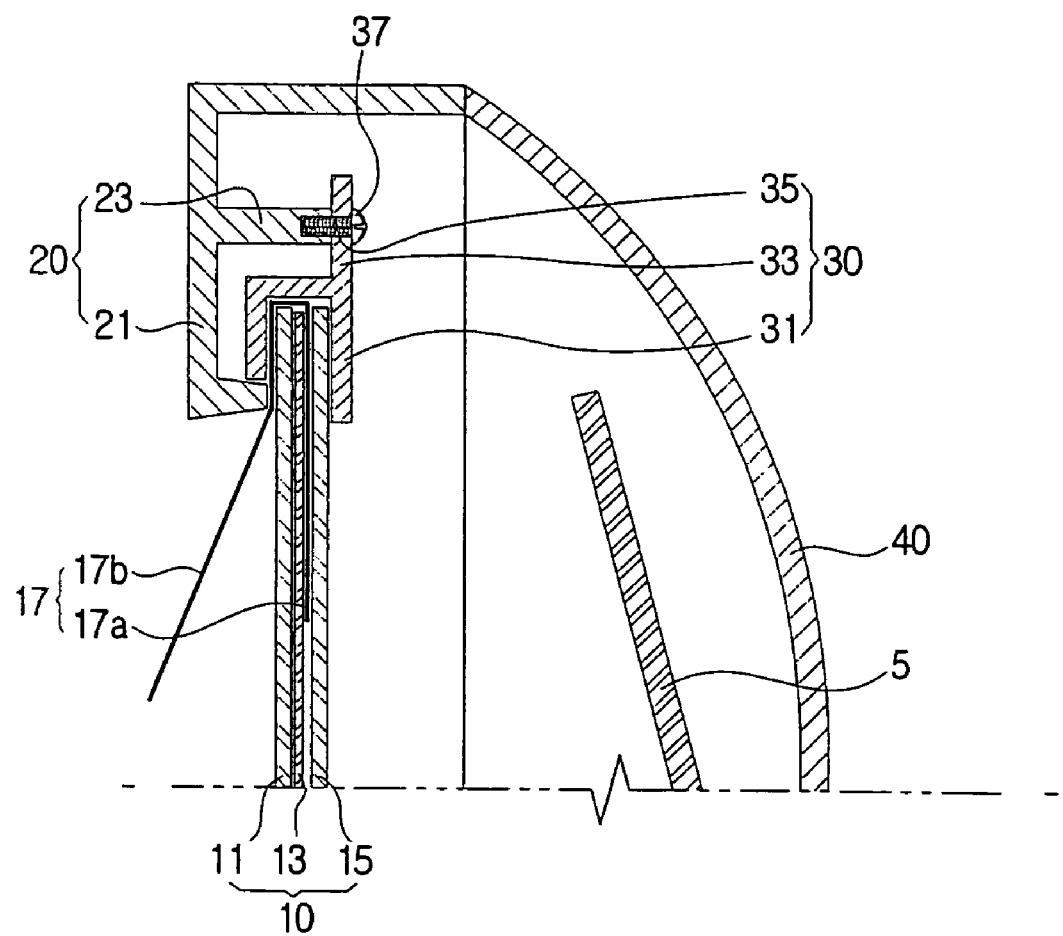
FIG. 2 is a partial sectional view of the projection television taken along the line II-II in FIG. 1.
Figure 3:
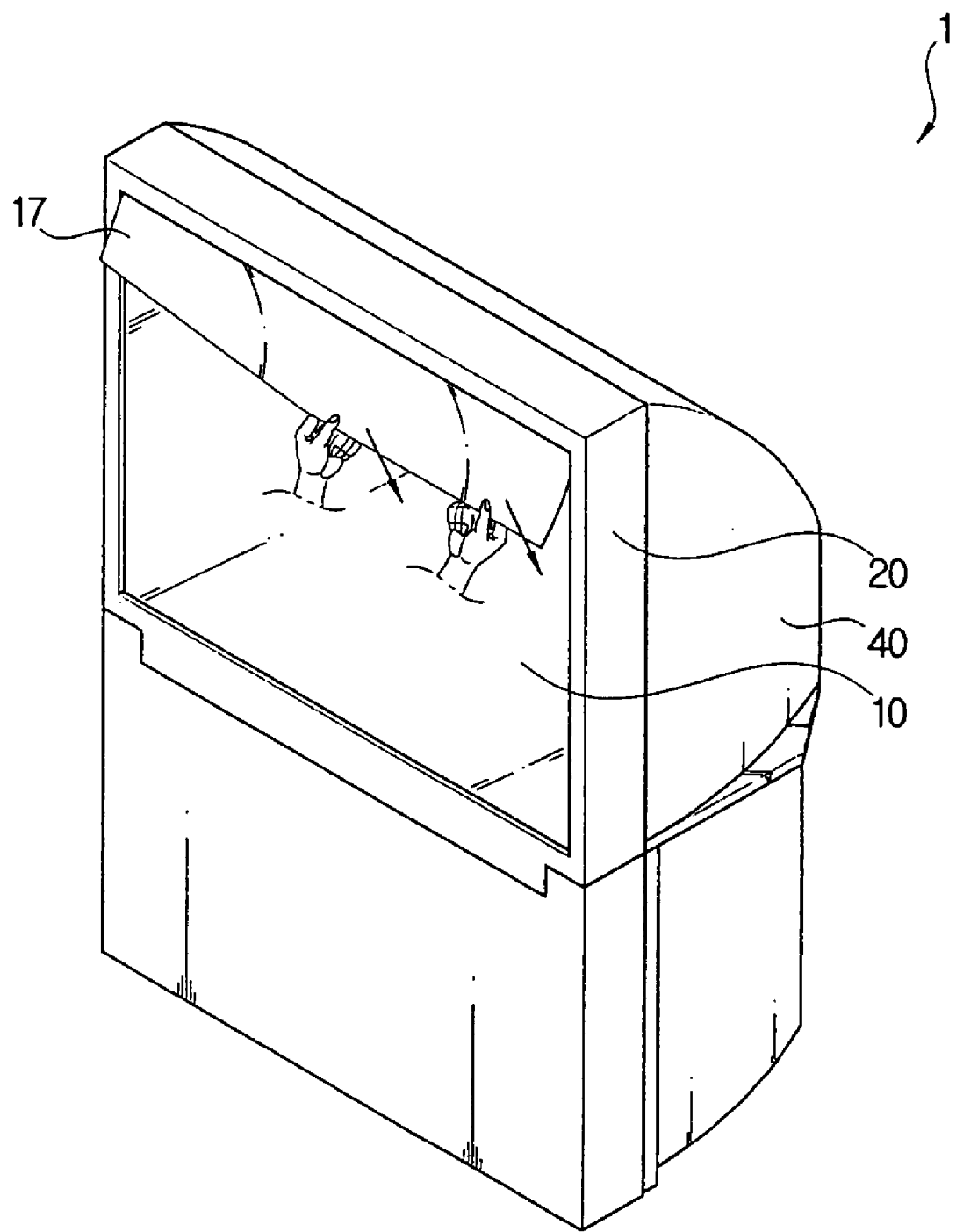
FIGS. 3 and 4 are partial perspective views showing a process to detach an anti-dust film from the projection television according to an embodiment of the present invention.
Figure 4:
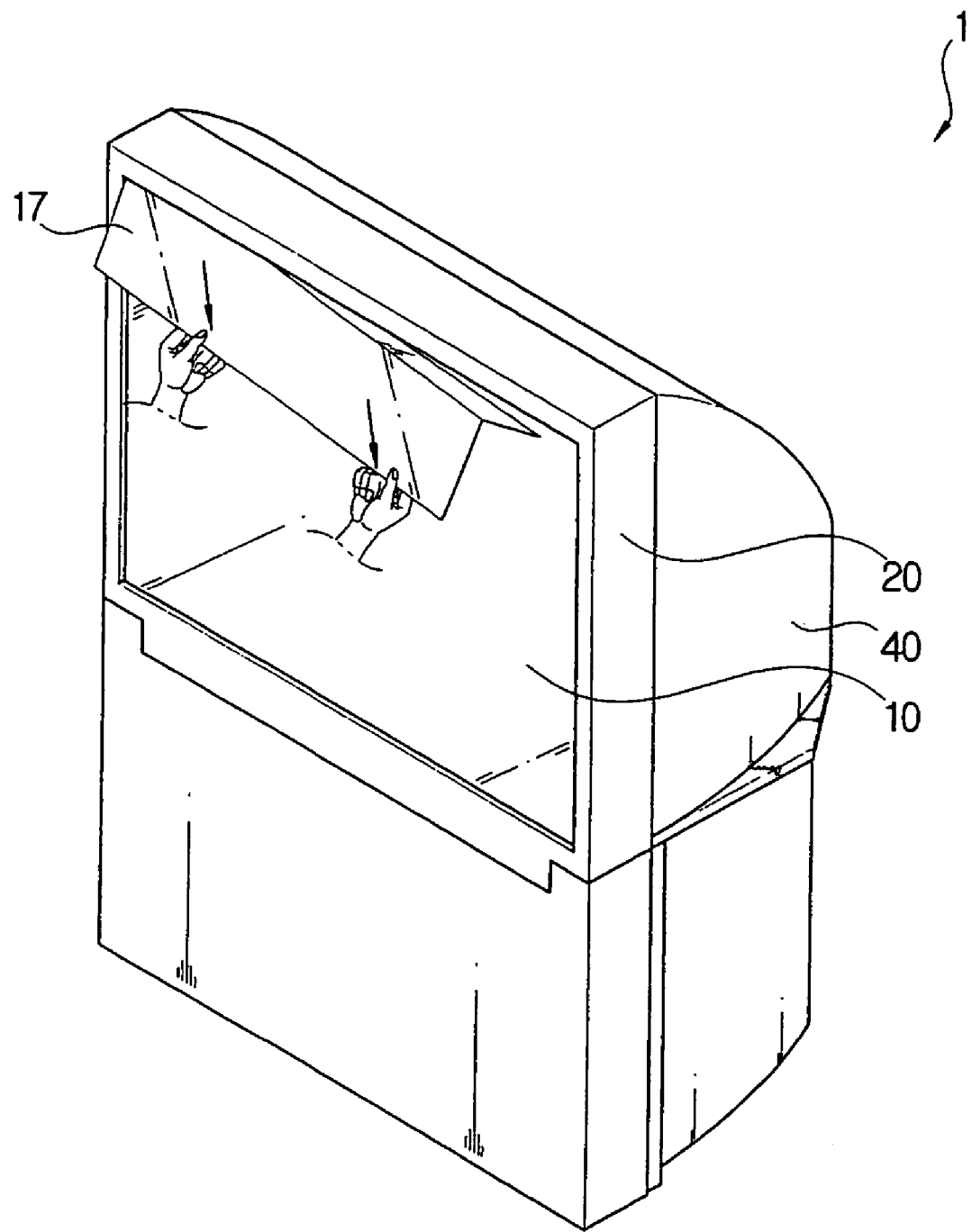

Reference will now be made in detail to embodiments of the present invention, examples of which are illustrated in the accompanying drawings, wherein like reference numerals refer to the like elements throughout. The embodiments are described below in order to explain the present invention by referring to the figures.

As shown in FIGS. 1 through 5, a projection television 1 according to an embodiment of the present invention comprises an optical engine (not shown) to project an image beam, a screen 10 having a plurality of image-forming sheets to form an image by the image beam projected from the optical engine and at least one anti-dust film 17 having a first side provided between the image-forming sheets and a second side exposed to a front of the screen 10 and detachable from the screen 10. The projection television 1 according to an embodiment of the present invention may further comprise a reflecting mirror 5 to reflect the beam projected from the optical engine and project the beam to the screen 10, casings 20 and 40 provided at a front and a rear of the screen 10 to form an external appearance and a screen supporter 30 to support the screen 10 with respect to the casings 20 and 40.

The casings 20 and 40 comprise a front casing 20 provided at a front of the screen 10 to form a front external appearance and opened to expose an image of the screen 10 and a rear casing 40 provided at a rear of the screen 10 to form a rear external appearance and to support the reflecting mirror 5 and the optical engine (not shown).

An optical engine can be classified by the method used. Such methods include a CRT (Cathode-Ray Tube) method, an LCD (Liquid Crystal Display) method, and a DLP (Digital Light Processing) method, but are not necessarily limited thereto.

The front casing 20 comprises a mask 21 forming the front external appearance of the projecting television 1 and opened to expose the image of the screen 10 and a plurality of bosses 23 provided on a rear surface of the mask 21 to be connected to the screen supporter 30 with a fastener such as a screw 37.

As an aspect of the present invention, the mask 21 may have a first end curved to contact to a front edge of the screen 10 and a second end curved to be connected to the rear casing 40.

The rear casing 40 forms a rear external appearance and a side external appearance of the projection television 1 and has a front surface connected to the mask 21 with a fastener such as a screw. At a lower part of inside of the rear casing 40 is provided the engine (not shown) to project the image beam for forming an image and at an upper part of the inside of the rear casing 40 is inclinedly provided the reflecting mirror 5 to reflect the image beam projected from the optical engine to the screen. On a bottom of the rear casing 40 is provided a circuit substrate (not shown) to control the optical engine and the like.

The screen supporter 30 comprises a screen holder 31 to accommodate the edge of the screen 10 and a supporting bracket 33 extending from the screen holder 31 to mount the screen supporter 30 on the boss 23.

The screen holder 31 has a U-shaped section to accommodate and support the edge of the screen 10. According to an aspect of the present invention, the width of inner surfaces of the screen holder 31 to accommodate the edge of the screen 10 may be wider than the thickness of the screen 10, so that the thickness of the screen 10 may be changed according to a temperature. The width of the inner surfaces of the screen holder 31 may be 0.3 mm through 0.5 mm wider than the thickness of the screen 10.

As an aspect of the present invention, the supporting bracket 33 may be formed with a plurality of connecting holes 35 to be connected to the boss 23 with a fastener such as, by way of a non-limiting example, a screw 37. That is, the supporting bracket 33 may be connected to the front casing 20 with a hook and the like.

The screen 10 is of a plate shape to form the image by the image beam reflected from the reflecting mirror 5 provided behind the screen 10. The image-forming sheets of the screen 10 include a Fresnel lens 15 to form the image by the image beam reflected from the reflecting mirror 5 and a Lenticular lens 13 provided in the front of the Fresnel lens 15. The image-forming sheets of the screen 10 may comprise a sunscreen 11 provided in the front of the Lenticular lens 13 to protect the Lenticular lens 13, but not limited thereto. Another type of sheet or lens may be implemented as an image-forming sheet of the projection television 1 according to the embodiment of the present invention. As an aspect of the present invention, adhesive tapes (not shown) may be adhered to the edge of the screen 10 to protect the screen 10. The adhesive tapes may be adhered to parts at which the anti-dust film 17 is not provided, so that the adhesive tapes don't interfere with the anti-dust film 17.

The Fresnel lens 15 is employed to throw the image beam reflected from the reflecting mirror 5 straight in a horizontal direction. To throw the image beam straight, the Fresnel lens 15 comprises a "bull's eye lens" in the center thereof.

The Lenticular lens 13 scatters the image beam thrown straight through the Fresnel lens 15 to provide a wide optic angle to a viewer of the projection television 1. The Lenticular lens 15 may be provided in the vicinity of the Fresnel lens 15 to be in the same focus with the Fresnel lens 15.

The anti-dust film 17 serves to prevent dust generated between the plurality of image-forming sheets provided in the screen 10. That is, the anti-dust film 17 prevents dust that may be generated by a friction between the plurality of image-forming sheets if the projection television 1 shakes by an external force for a long time while the projection television 1 is transported. The anti-dust film 17 has a first side 17a provided between the plurality of image-forming sheets to prevent the dust generated between the plurality of image-forming sheets and a second side 17b exposed to the outside of the screen 10 and to be detached when the projection television 1 doesn't require further transport such as when the projection television arrives at a destination. As an aspect of the present invention, the first side 17a may be detached from the projection television 1 with ease when a user pulls out the second side 17b of the anti-dust film 17.

As an aspect of the present invention, the first side 17a of the anti-dust film 17 may be provided between the Lenticular lens 13 and the Fresnel lens 15, as the dust may be generated by a friction between the "the bull's eye lens" formed on a front of the Fresnel lens 15 and a rear of the Lenticular lens 13. The first side 17a of the anti-dust film 17 may be provided at an upper part between the Lenticular lens 13 and the Fresnel lens 15, as the dust may be generated frequently at the upper part between the Lenticular lens 13 and the Fresnel lens 15 in the projection television 1 according to the embodiment of the present invention. As an aspect of the present invention, the length of the first side 17a of the anti-dust film 17 in a horizontal direction may be approximately the same as that of the Fresnel lens 15 or the Lenticular lens 13, but not limited thereto. That is, the length of the first side 17a of the anti-dust film 17 may be shorter than that of the Fresnel lens 15 or the Lenticular lens 13. As an aspect of the present invention, the length of the first side 17a of the anti-dust film 17 in a vertical direction may be approximately 10 mm~20 mm, but is not limited thereto. That is, the length of the first side 17a of the anti-dust film 17 in a vertical direction may be longer or shorter than 10 mm~20 mm. The first side 17a of the anti-dust film 17 may be interposed on at least one of left part, right part and lower part between the Lenticular lens 13 and the Fresnel lens 15 or on a whole part between the Lenticular lens 13 and the Fresnel lens 15. As an aspect of the present invention, the first side 17a of the anti-dust film 17 may be provided between the Lenticular lens 13 and the sunscreen 11 or at least at a part of the area between the Lenticular lens 13 and the sunscreen 11 as described above. Here, a direction is defined as follows: upper and lower sides with respect to the projection television 1 in FIG. 1 is defined as upper and lower parts and right and left sides with respect to the projection television 1 in FIG. 1 is defined as right and left parts. As an aspect of the present invention, the anti-dust film 17 may be made of vinyl that can be detached from the screen 10 with ease, but not limited thereto. That is, the anti-dust film 17 may be made of soft fiber. The thickness of the anti-dust film 17 may be equal to or less than 0.3 mm, which can be detached from the screen 10 and the screen holder 31 with ease.

The second side 17b of the anti-dust film 17 may be exposed between the mask 21 and the screen 10. The second side 17b of the anti-dust film 17 may be exposed in a length with which a user can detach the anti-dust film 17 from the projection television with ease.

Figure 5:
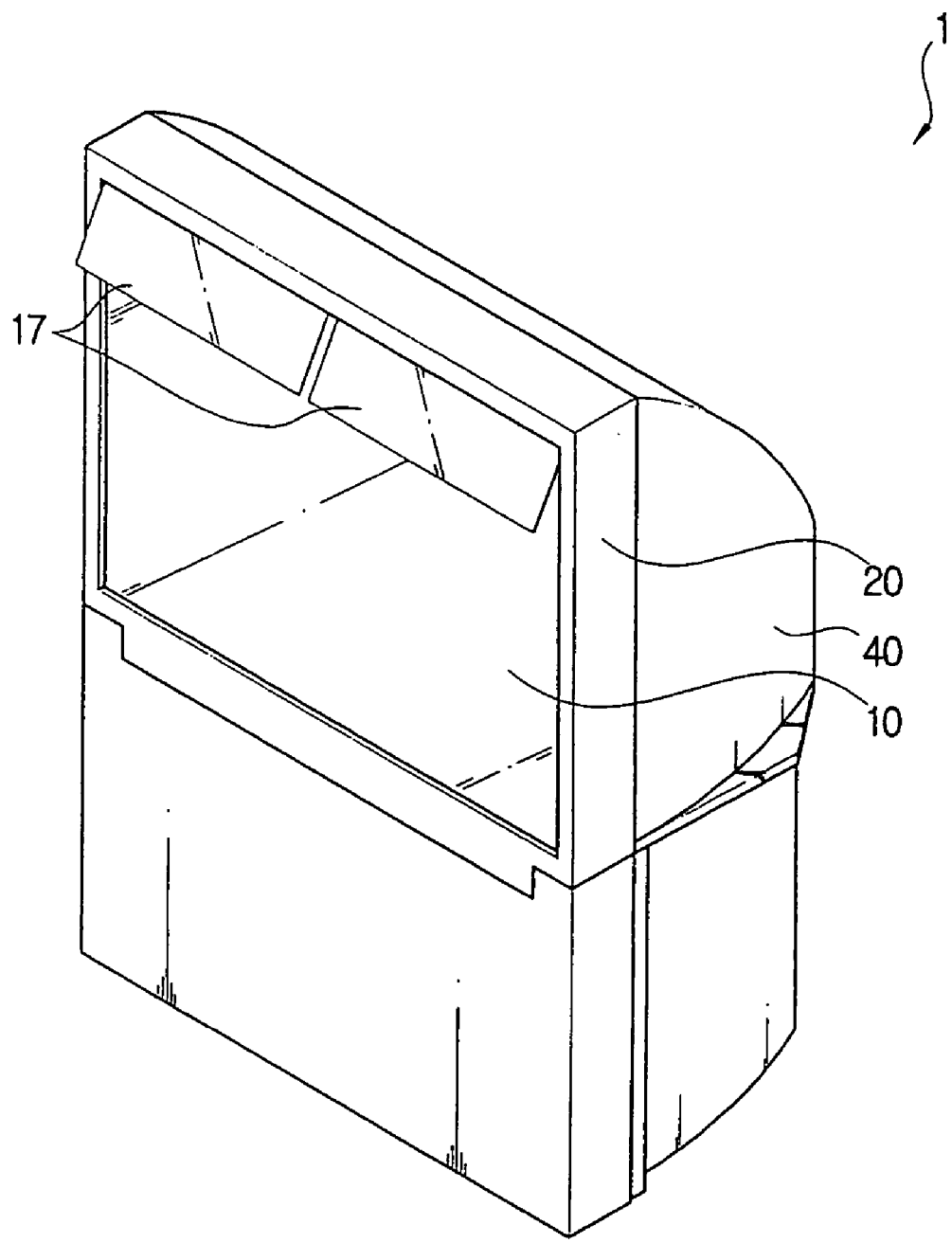
FIG. 5 is a partial perspective view of a plurality of anti-dust films provided in a projection television according to an embodiment of the present invention.

As shown in FIG. 5, at least two of the anti-dust films 17 may be provided.

A description of an assembly of the anti-dust film 17 in the projection television 5 according to the described embodiment of the present invention follows.

First, the first side 17a of the anti-dust film 17 is interposed at the upper part between the Lenticular lens 13 and the Fresnel lens 15. The sunscreen 11 is positioned in the front of the Lenticular lens 13, which is inserted in the screen holder 31 of the screen supporter 30. Here, a part of the anti-dust film 17 is inserted in the screen holder 30 together with the screen 10. The supporting bracket 33 of the screen supporter 30 is connected to the boss 23 with the screw 37. The second side 17b of the anti-dust film 17 is drawn out between the mask 21 and the screen 10 to be exposed to the front of the screen 10. Here, the first side 17a of the anti-dust film 17 may be drawn out between the screen 10 and the screen holder 31 when the user pulls the second side 17b of the anti-dust film 17. This is because the width of the inner surfaces of the screen holder 1 is wider than the thickness of the screen 10 (refer to FIGS. 3 and 4).

According to the described embodiment of the present invention, the projection television comprises the screen having the plurality of image-forming sheets and the anti-dust film having the first side provided between the plurality of image-forming sheets and the second side exposed to the front of the screen and detachable from the screen, thereby preventing the dust that may be generated by being shaken while in motion.

As described above, according to the present invention, the dust inside the screen generated by being shaken while in motion can be prevented.

Although an embodiment of the present invention have been shown and described, the present invention is not limited to the described embodiment. Instead, it would be appreciated by those skilled in the art that changes may be made in the embodiment without departing from the principles and spirit of the invention, the scope of which is defined by the claims and their equivalents.

What is claimed is:

1. A projection television comprising:
   a screen having a plurality of image-forming sheets; and
   an anti-dust film having a first side disposed between the image-forming sheets and a second side disposed at a front of the screen, and being detachable from the screen,
   wherein the image-forming sheets include a Fresnel lens and a Lenticular lens provided in the front of the Fresnel lens, and
   wherein the first side of the anti-dust film is between the Fresnel lens and the Lenticular lens, and
   wherein the first side of the anti-dust film is at an upper part between the Fresnel lens and the Lenticular lens.

2. The projection television of claim 1, further comprising:
   a casing having a mask provided on a front edge of the screen; and
   a screen supporter to support the screen,
   wherein the second side of the anti-dust film is exposed between the mask and the screen.

3. The projection television of claim 2, wherein the screen supporter includes a screen holder which accommodates an edge of the screen, and
   wherein a part of the anti-dust film is accommodated in the screen holder together with the screen.

4. The projection television of claim 1, further comprising:
   a casing having a mask provided on a front edge of the screen; and
   a screen supporter to support the screen,
   wherein the second side of the anti-dust film is exposed between the mask and the screen.

5. The projection television of claim 4, wherein the screen supporter includes a screen holder which accommodates an edge of the screen, and
   wherein a part of the anti-dust film is accommodated in the screen holder together with the screen.

6. The projection television of claim 1, further comprising:
   a casing having a mask provided on a front edge of the screen; and
   a screen supporter to support the screen,
   wherein the second side of the anti-dust film is exposed between the mask and the screen.

7. The projection television of claim 6, wherein the screen supporter includes a screen holder which accommodates an edge of the screen, and
   a part of the anti-dust film is accommodated in the screen holder together with the screen.

8. The projection television according to claim 1, wherein the anti-dust film is vinyl.

9. The projection television of claim 1, further comprising:
   a reflecting mirror which reflects the beam projected from an optical engine so as to project the beam to the screen;
   casings provided at a front and a rear of the screen to form external surfaces of the projection television; and
   a screen supporter which supports the screen.

10. The projection television of claim 9, wherein the casings include a front casing at a front of the screen and form a front external surface of the projecting television configured to expose an image on the screen and a rear casing at a rear of the screen which casing forms a rear external surface of the projecting television and supports the reflecting mirror and the optical engine.

11. The projection television of claim 10, wherein the front casing includes a mask forming the front external surface and opened to expose the image on the screen and a plurality of bosses on a rear surface of the mask which are connectable to the screen supporter.

12. The projection television of claim 10, wherein the front casing includes a boss and the screen supporter includes a screen holder which accepts an edge of the screen and a supporting bracket extending from the screen holder to mount the screen supporter on the boss.

13. The projection television of claim 12, wherein the screen holder has a "U"-shaped section which accommodates an edge of the screen.

14. The projection television of claim 12, wherein a width of inner surfaces of the screen holder are wider than a thickness of the screen.

15. The projection television of claim 12, wherein a width of the inner surfaces of the screen holder are between about 0.3 mm and 0.5 mm wider than a thickness of the screen.

16. The projection television of claim 1, wherein adhesive tape is adhered to an edge of the screen to protect the screen.

17. The projection television of claim 1, wherein the anti-dust film has a first side detachable from the projection television when a second side of the anti-dust film is pulled.

18. The projection television of claim 1, wherein a horizontal length of the first side of the anti-dust film is shorter than a horizontal length of at least one of the Fresnel lens and the Lenticular lens.

19. The projection television of claim 1, wherein a vertical length of the first side of the anti-dust film is between about 10 mm to 20 mm.

20. The projection television of claim 1, wherein the first side of the anti-dust film is disposed between at least part of the Lenticular lens and the sunscreen.

21. The projection television of claim 1, wherein the anti-dust film is made of a soft fiber.

22. The projection television of claim 1, wherein the thickness of the anti-dust film is one of equal to and less than about 0.3 mm.

23. The projection television of claim 1, wherein the anti-dust film includes multiple anti-dust films.

* * * * *